(12) United States Patent
Speggiorin

(10) Patent No.: US 7,182,303 B2
(45) Date of Patent: Feb. 27, 2007

(54) STABILIZER WITH TELESCOPIC RODS FOR TRIPODS

(75) Inventor: Paolo Speggiorin, Mussolente (IT)

(73) Assignee: Lino Manfrotto + Co. S.p.A., Bassano del Grappa (IT)

( * ) Notice: Subject to any disclaimer, the term of this patent is extended or adjusted under 35 U.S.C. 154(b) by 213 days.

(21) Appl. No.: 10/483,107

(22) PCT Filed: Jul. 5, 2002

(86) PCT No.: PCT/EP02/07502

§ 371 (c)(1),
(2), (4) Date: Jan. 7, 2004

(87) PCT Pub. No.: WO03/008855

PCT Pub. Date: Jan. 30, 2003

(65) Prior Publication Data

US 2004/0188575 A1 Sep. 30, 2004

(30) Foreign Application Priority Data

Jul. 17, 2001 (IT) .......................... PD2001A0180

(51) Int. Cl.
*F16M 11/00* (2006.01)

(52) U.S. Cl. ................ 248/168; 248/176.1; 248/177.1; 403/109.1

(58) Field of Classification Search ................ 248/168, 248/169, 177.1, 163.1, 434, 435; 403/109.1, 403/109.2, 109.3
See application file for complete search history.

(56) References Cited

U.S. PATENT DOCUMENTS 559,368 A  5/1896 Dieterich
1,495,458 A * 5/1924 Thalhammer ................ 248/169
1,732,081 A  10/1929 Clement
2,282,285 A * 5/1942 Olson .......................... 248/169
2,467,005 A  4/1949 Belanoff
2,579,348 A * 12/1951 Taylor ...................... 248/178.1
2,668,682 A * 2/1954 Dalton ........................ 248/169
4,324,477 A * 4/1982 Miyazaki ................. 248/163.1
4,602,890 A  7/1986 Duda
4,648,697 A * 3/1987 Kawazoe ................. 248/163.1
5,503,357 A * 4/1996 Johnson et al. .......... 248/188.5
6,598,841 B2 * 7/2003 Erickson et al. ......... 248/188.5

FOREIGN PATENT DOCUMENTS

DE   546 178 C    3/1932
GB   701937 A     1/1954
GB   2 257 355 A  1/1993

* cited by examiner

Primary Examiner—Anita King
Assistant Examiner—Steven Marsh
(74) Attorney, Agent, or Firm—RatnerPrestia

(57) ABSTRACT

A stabilizser for tripods and the like. The stabilizer includes a rod for each tripod leg, arranged for connection on one side to the corresponding leg and converging, on the other side, in a common connection. The rods each comprise at least two rod members slideable telescopically one with respect to the other in an axial direction, and an arresting component for reversibly locking the rod members one with respect to the other according to the pre-selected adjustment, wherein the arresting component is of a unidirectional type, active in only one direction between the rod members for releasably blocking their relative axial sliding in one direction and for permitting free axial sliding in the opposite direction.

19 Claims, 3 Drawing Sheets

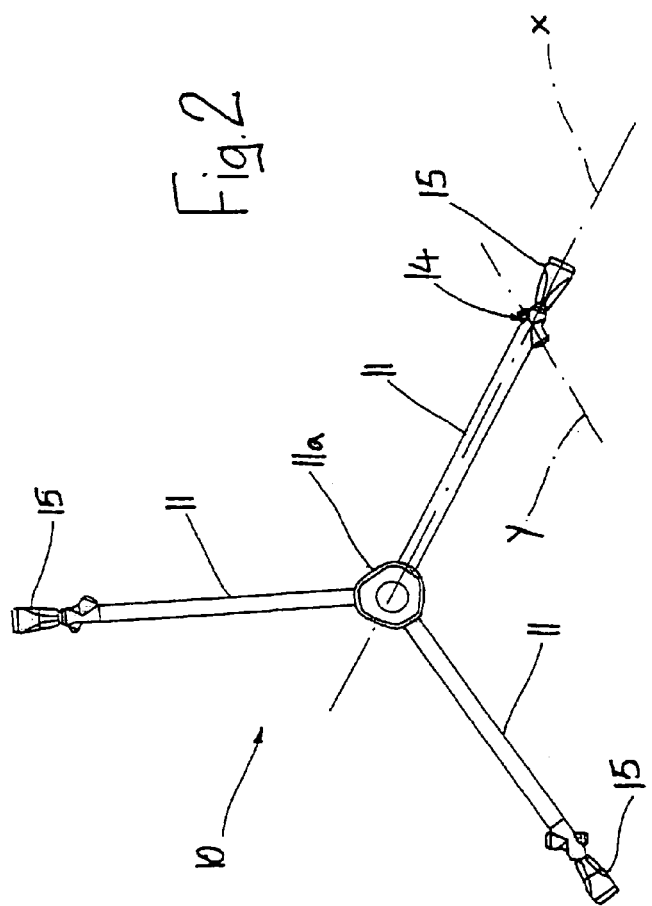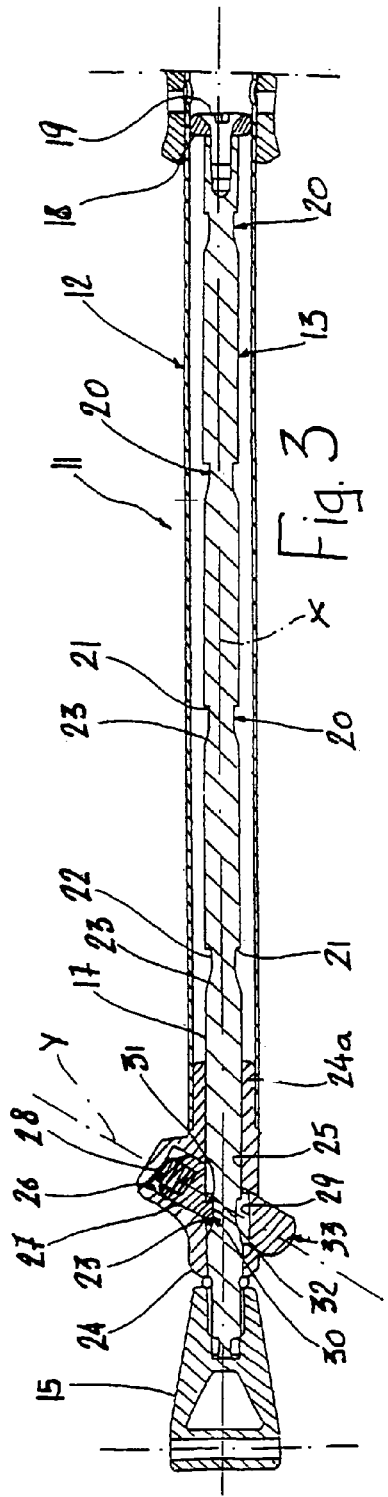

STABILIZER WITH TELESCOPIC RODS FOR TRIPODS

This application is a U.S. national phase application of PCT International Application No. PCT/EP02/07502 filed on Jul. 5, 2002.

TECHNICAL FIELD

The subject of the present invention is a stabilizer with telescopic rods for tripods and the like.

TECHNICAL BACKGROUND

The term "tripod" used in this document is intended to signify a support structure particularly for optical, photographic and cinematographic equipment, including at least three legs interconnected by a stabilizer. Structures of the aforesaid type are known from the current production of the assignee of the present application.

In the known tripods provision is made for the stabilizer to have telescopic rods connected at one end to the respective leg and converging at the opposite ends in a common connection.

Such rods each comprise two rod members telescopically slideable one inside the other, and an arresting mechanism for reversibly blocking the relative sliding of the rod members with respect to each other.

Normally, the arresting mechanisms used are of the type with a sleeve that can be clamped, or with locking by a handle or lever. In all cases, provision is made for direct intervention by the operator on the locking structure both for locking the rod members in the desired position and for releasing them when, after use, it is desired to close and move the tripod.

This second operation, in particular, is especially unwanted since, when it is desired to close and move the tripod to bring it to a new location, it is often necessary to act promptly and rapidly, for example in order to catch the images of a specific contingent situation.

It is therefore an obvious hindrance for it to be necessary, for example in a three-legged tripod, to unlock all three rods of the stabiliser in order to be able to close the tripod.

SUMMARY OF THE INVENTION

The technical problem confronted by the present invention is that of substantially simplifying and facilitating the operations of closing the tripod. Within the scope of this problem, it is a primary aim of the invention also to influence positively the operations of opening and adjusting the stabilizer.

A further aim of the invention is that of making it possible to carry out both operations with one hand and, within the limits of possibility, with an appreciable quietness of operation.

This problem, as well as this and other aims are confronted and solved by the invention by providing a stabilizer for a tripod or the like. The tripod includes a rod for each tripod leg. The rods are hinged on one side to the corresponding leg and, on the other side, converge in a common connecting member. The rods each have at least two rod members that can slide telescopically one with respect to the other in an axial direction, and an arresting mechanism for reversibly locking the rod members one with respect to the other according to a pre-selected adjustment. Thus, the tripod can be moved among a first inoperative position in which the legs are closed toward each other, a first operative position in which the legs are spread apart as far as permitted by the stabilizer with the rods retracted, and a second operative position in which the legs are spread apart as permitted by the stabilizer with the rods adjusted to the desired length. The arresting mechanism is of a unidirectional type, active in only one direction between the rod members for releasably blocking their relative axial sliding in one direction and for permitting free axial sliding in the opposite direction.

It is to be understood that both the foregoing general description and the following detailed description are exemplary, but are not restrictive, of the invention.

BRIEF DESCRIPTION OF THE DRAWINGS

The characteristics and advantages of the invention will become clearer from a detailed description of one of its preferred exemplary embodiments, illustrated by way of non-limiting example with reference to the appended drawings, in which:

FIG. 2 is a plan view of the stabilizer used in the tripod of FIG. 1; and

FIG. 3 is a sectional view on an enlarged scale of a detail of FIG. 2.

DETAILED DESCRIPTION OF THE INVENTION

Figure 1:
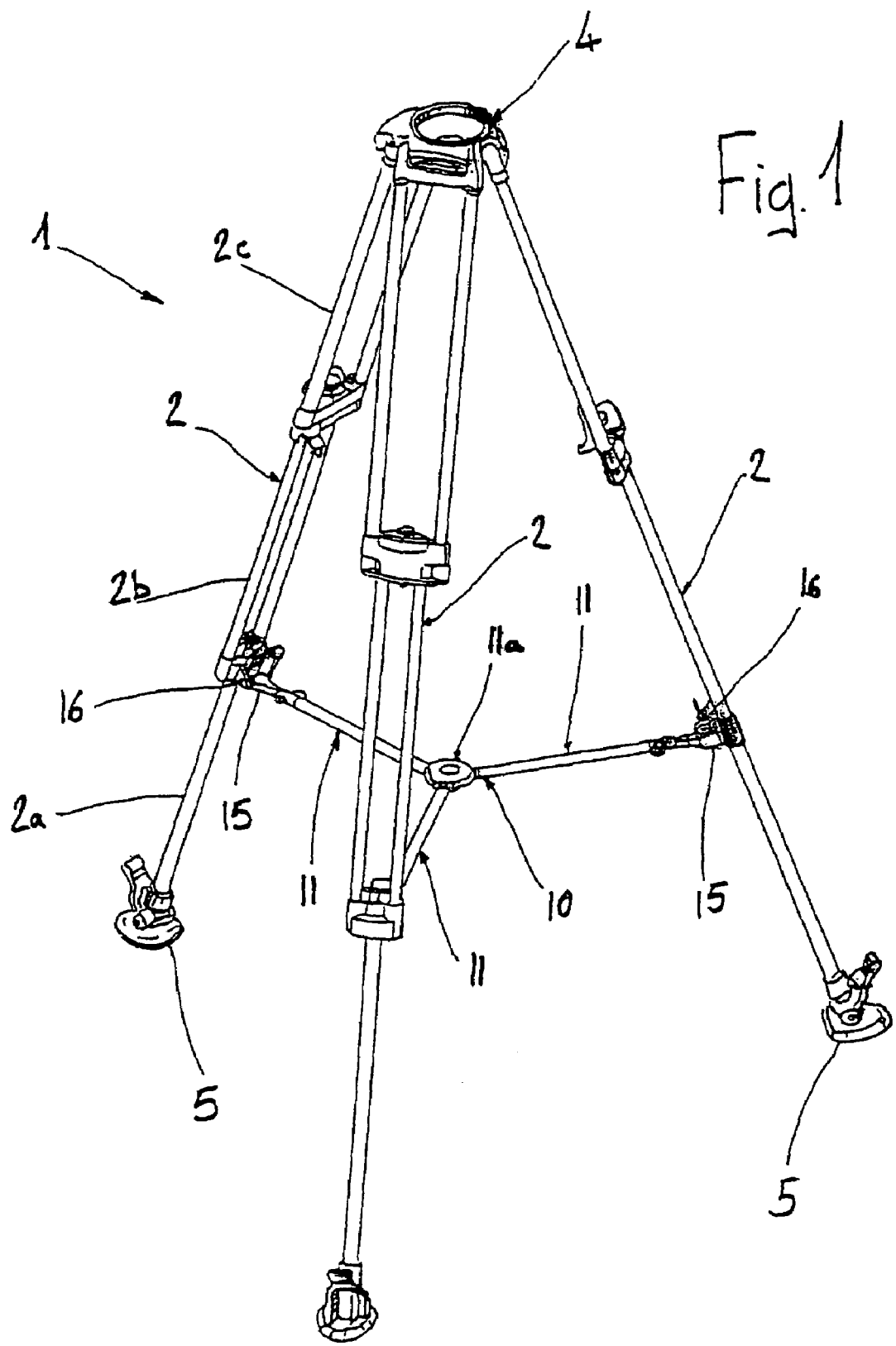
FIG. 1 is a perspective overall view of a tripod provided with a stabilizer produced according to the present invention.
Figure 4A:
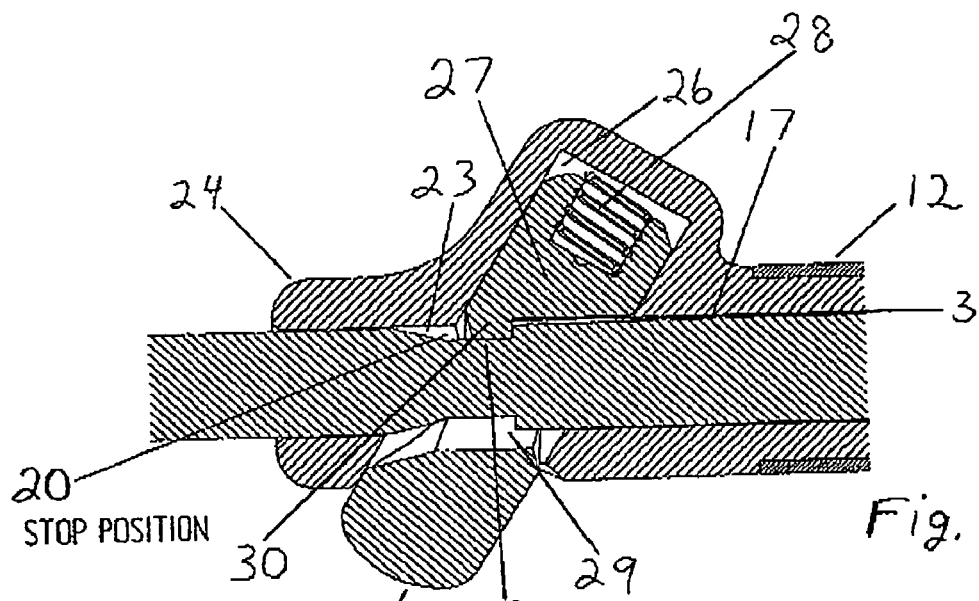
FIGS. 4A and 4B are sectional views on an enlarged scale of a detail of FIG. 3.
Figure 4B:
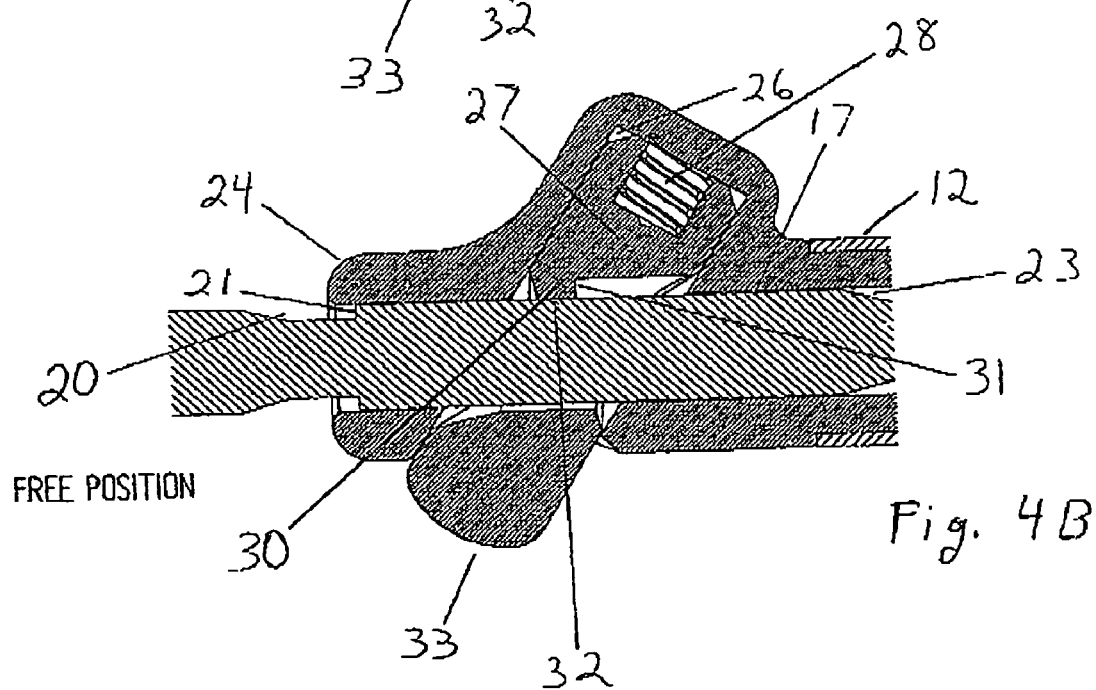

Referring now to the figures, in which like reference numbers refer to like elements throughout the various figures, the reference number 1 indicates as a whole a tripod with legs, all indicated by 2, that can be elongated telescopically, of a structure which is conventional per se. The legs 2 of the tripod 1, according to the example illustrated, are of the type having three sliding sections 2a, 2b, 2c, and bear at a respective first end a spider 4 in which the legs converge, and also, at the opposite end, respective feet 5.

The three legs 2 are interconnected with one another by a stabilizer indicated as a whole by 10. The stabilizer 10 comprises three rods, all indicated by 11, connected at one end to the corresponding leg 2 and converging, at the opposite end, in a common connecting member 11a.

Each rod 11 comprises at least two rod members 12, 13 telescopically slideable one with respect to the other in an axial direction X. Preferably, the member 12 is produced with a tubular shape and receives, guided inside it, the member 13.

The rod members 12, 13 are equipped with an arresting mechanism indicated as a whole by 14, for reversibly locking the rod members 12, 13 one with respect to the other in different pre-selected adjustment positions, as will be explained hereinafter.

The rod member 13 carries screwed to the end facing towards the corresponding leg 2 a first hinge member 15 by which it is articulated to a second hinge member 16 belonging to the second sliding section 2b of the leg 2. It further comprises a stem 17 which bears at the opposite end a guide plug 18 held by a screw 19 and through which it is guided inside the tubular section of the rod member 12.

Provided along the stem 17 are a plurality of annular notches 20 including a shoulder 21 facing towards the first hinge member 15, a short cylindrical section 22 and a frustoconical ramp 23 diverging away from the corresponding shoulder 21.

In the example proposed, five (5) such notches 20 are provided, it being understood that the number thereof may vary as required.

The notches 20 constitute part of the arresting mechanism 14 intended for the reversible locking of the rod members 12 and 13 one with respect to the other, belonging to the rod member 13.

Such arresting mechanism 14 co-operates with corresponding structures associated with the rod member 12 and comprises a sleeve body 24, one end 24a of which is engaged in the tubular part of the rod member 12. The sleeve body 24 is traversed by an axial cavity 25 in which is guided the stem 17 of the first rod member 13, and comprises a cavity 26 of axis Y, inclined with respect to the axis X, in a direction substantially perpendicular to the frustoconical surface of the ramps 23.

In the cavity 26 is slidably guided a sliding block 27 movable in the direction of the axis Y against a spring 28. The sliding block 27 is involved by a through hole 29 traversed by the stem 17 of the rod member 13.

In the sliding block 27 a projection 30 is provided, acting in the hole 29, and on which are defined an annular abutment surface 31, extending through an are of less than 180° on the side corresponding to the spring 28, and a guide surface 32 substantially perpendicular to the abutment surface 31 and facing the stem 17. The abutment surface 31 is arranged to engage the shoulder 21 of any one of the notches 20 for unidirectional locking of the relative sliding between the rod members 12, 13 along the axis X of telescopic elongation of the rods 11, to which the divergence of the legs 2 corresponds, while the guide surface 32, by engagement with the ramp 23 of the corresponding notches 20, determines the sliding of the sliding block 27 in its own seat against the spring 28, and the consequent free retraction of the two rod members 12, 13 one into the other.

The sliding block 27 is also provided with a push-button control 33 for actuation in disengagement from the notches 20; such a push-button control 33 is preferably provided in one piece with the sliding block 27 itself.

To set up the tripod 1, the legs 2 are spread apart as far as permitted by the stabilizer 10 in the state with rods 11 retracted, and then a single adjustment of each rod 11 is carried out, according to the bearing conditions provided by the surrounding ground.

In order so to do, the push-button 33 is pressed by hand, releasing the sliding block 27 from the corresponding annular notch 20 and thus permitting free sliding of the rod members 12, 13 one with respect to the other.

By releasing the sliding block 27 and, if necessary, adjusting the relative position of the rod members 12, 13 until the sliding block 27 snaps into engagement with one of the corresponding notches 20, the tripod 1 is set up efficiently and in a stable manner.

For re-positioning, it is sufficient to close the legs 2 towards one another. The sliding block 27, guided by the frustoconical ramps 23 of the notches 20, will be disengaged from the rod member 13 with consequent free sliding of the latter into the retracted position inside the rod member 12.

The invention thus fulfils the aims proposed by obtaining numerous advantages with respect to the present state of the art, among which are a notable simplification of the operations of setting up the tripod 1, particularly in the phase of closure, an appreciable quietness of operation during the adjustment phases, and a high degree of manoeuvrability, even with only one hand.

Although illustrated and described above with reference to certain specific embodiments, the present invention is nevertheless not intended to be limited to the details shown. Rather, various modifications may be made in the details within the scope and range of equivalents of the claims and without departing from the spirit of the invention.

The invention claimed is:

1. A tripod comprising:
    a plurality of legs; and
    a stabilizer including:
        (a) a connecting member,
        (b) a rod for each tripod leg, the rods being hinged on one side to the corresponding leg and converging, on the other side, in the connecting member, the rods each having at least two rod members slidable telescopically one with respect to the other in an axial direction, and
        (c) arresting means for reversibly locking the rod members one with respect to the other according to a pre-selected adjustment, the arresting means being unidirectional because the arresting means locks only in a first direction of sliable movement between the rod members for releasably blocking their relative axial sliding in the first direction and for permitting free axial sliding in the opposite direction,
    so that the tripod is movable among a first inoperative position in which the legs are closed toward each other, a first operative position in which the legs are spread apart as far as permitted by the stabilizer with the rods retracted, and a second operative position in which the legs are spread apart as permitted by the stabilizer with the rods adjusted to the desired length, and
    the arresting means comprises, for each rod, on one of the rod members a plurality of notches defined on one side by a shoulder and on the axially opposed side by a ramp, and on the other of the rod members a sliding block slidably guided in a direction incident to the axial direction, the sliding block being guided from and towards a state of engagement with the notches and being urged towards the state of engagement, the sliding block bearing an abutment surface capable of abutting against any one of the shoulders in the first direction, and a guide surface capable of sliding on the ramp in the opposite direction for disengaging the sliding block from the corresponding notch.

2. The tripod according to claim 1, wherein the first direction is that tending towards telescopic extraction of the rod members.

3. The tripod according to claim 1, wherein the sliding block is resiliently urged in the state of engagement towards the notches.

4. The tripod according to claim 1, wherein the incident direction is approximately perpendicular to the surface of the ramp.

5. The tripod according to claim 1, wherein the ramp has a frustoconical surface.

6. The tripod according to claim 1, wherein the shoulders extend radially with respect to the rod member.

7. The tripod according to claim 1, further comprising a push-button control connected to the sliding block which, upon actuation, disengages the sliding block from the notches.

8. The tripod according to claim 7, wherein the push-button control is integral with the sliding block.

9. A stabilizer for a device having a plurality of legs, the stabilizer comprising:
a connecting member;
a rod for each device leg, the rod being hinged at one side to the device leg and converging, on the other side, in the connecting member, each rod having at least two rod members slidable telescopically one with respect to the other in an axial direction; and
an arresting mechanism reversibly locking the rod members one with respect to the other according to a pre-selected adjustment, the arresting mechanism including for each rod:
(a) a plurality of pairs of shoulders and ramps on one of the rod members with each ramp axially distanced from each shoulder, each pair of shoulder and ramp defining between them a notch, and
(b) a sliding block on the other of the rod members, the sliding block having an abutment surface abutting against any one of the shoulders in a first direction and a guide surface sliding on the ramp in the opposite direction for disengaging the sliding block from the corresponding notch, the sliding block slidably guided in a direction incident to the axial direction and being guided from and towards a state of engagement with the notches and being urged towards the state of engagement,
the arresting mechanism being unidirectional because the arresting mechanism locks only in the first direction of slidable movement between the rod members for releasably blocking their relative axial sliding in one direction and for permitting free axial sliding in the opposite direction,
so that the device is movable among a first inoperative position in which the legs are closed toward each other, a first operative position in which the legs are spread apart as far as permitted by the stabilizer with the rods retracted, and a second operative position in which the legs are spread apart as permitted by the stabilizer with the rods adjusted to the desired length.

10. The stabilizer according to claim 9 wherein the first direction is that tending towards telescopic extraction of the rod members.

11. The stabilizer according to claim 9 further comprising a spring resiliently urging the sliding block into engagement with the notches.

12. The stabilizer according to claim 9 wherein the incident direction is approximately perpendicular to the surface of the ramp.

13. The stabilizer according to claim 9 wherein the ramp has a frustoconical surface.

14. The stabilizer according to claim 9 wherein the shoulders extend radially with respect to the rod member.

15. The stabilizer according to claim 9 further comprising a push-button control connected to the sliding block which, upon actuation, disengages the sliding block from the notches.

16. The stabilizer according to claim 15 wherein the push-button control is integral with the sliding block.

17. A stabilizer for a device having a plurality of legs, the stabilizer comprising:
a connecting member;
a rod for each device leg, the rod being hinged at one side to the device leg and converging, on the other side, in the connecting member, each rod having at least two rod members slidable telescopically one with respect to the other in an axial direction; and
an arresting mechanism reversibly locking the rod members one with respect to the other according to a pre-selected adjustment, the arresting mechanism including for each rod:
(a) a plurality of pairs of shoulders and ramps on one of the rod members with each ramp axially distanced from each shoulder and having a frustoconical surface and each shoulder extending radially with respect to the rod member, each pair of shoulder and ramp defining between them a notch,
(b) a sliding block on the other of the rod members, the sliding block having an abutment surface abutting against any one of the shoulders in a first direction and a guide surface sliding on the ramp in the opposite direction for disengaging the sliding block from the corresponding notch, the sliding block slidably guided in a direction incident to the axial direction and being guided from and towards a state of engagement with the notches,
(c) a spring resiliently urging the sliding block into engagement with the notches, and
(d) a push-button control connected to the sliding block which, upon actuation, disengages the sliding block from the notches,
the arresting mechanism being unidirectional because the arresting mechanism locks only in the first direction of slidable movement between the rod members for releasably blocking their relative axial sliding in one direction and for permitting free axial sliding in the opposite direction,
so that the device is movable among a first inoperative position in which the legs are closed toward each other, a first operative position in which the legs are spread apart as far as permitted by the stabilizer with the rods retracted, and a second operative position in which the legs are spread apart as permitted by the stabilizer with the rods adjusted to the desired length.

18. The stabilizer according to claim 17 wherein the first direction is that tending towards telescopic extraction of the rod members.

19. The stabilizer according to claim 17 wherein the incident direction is approximately perpendicular to the surface of the ramp.

* * * * *